United States Patent
Lux et al.

(10) Patent No.: US 11,837,922 B2
(45) Date of Patent: Dec. 5, 2023

(54) ELECTRIC MACHINE

(71) Applicant: AUDI AG, Ingolstadt (DE)

(72) Inventors: Moritz Lux, Munich (DE); Lars Wetterau, Ingolstadt (DE); Peter Suess, Stammham (DE); Maximilian Schröder, Ingolstadt (DE); Vladimir Chernogorski, Ingolstadt (DE); Korbinian Weber, Ingolstadt (DE)

(73) Assignee: Audi AG, Ingolstadt (DE)

( * ) Notice: Subject to any disclaimer, the term of this patent is extended or adjusted under 35 U.S.C. 154(b) by 75 days.

(21) Appl. No.: 17/195,307

(22) Filed: Mar. 8, 2021

(65) Prior Publication Data

US 2021/0281134 A1    Sep. 9, 2021

(30) Foreign Application Priority Data

Mar. 9, 2020 (DE) .......................... 102020106341.5

(51) Int. Cl.
*H02K 1/32* (2006.01)
(52) U.S. Cl.
CPC ...................................... *H02K 1/32* (2013.01)
(58) Field of Classification Search
CPC .................................. H02K 1/32; H02K 21/14
USPC ........................................................... 310/52
See application file for complete search history.

(56) References Cited

U.S. PATENT DOCUMENTS

| | | | | |
|---|---|---|---|---|
| 9,627,943 B2* | 4/2017 | Tokunaga | ................ | H02K 9/19 |
| 9,847,682 B2* | 12/2017 | Takahashi | .............. | H02K 9/197 |
| 9,847,698 B2* | 12/2017 | Yoshinori | ................ | H02K 1/32 |
| 9,917,486 B2* | 3/2018 | Kirkley, Jr. | .............. | H02K 3/24 |
| 9,960,649 B2* | 5/2018 | Yoshinori | .............. | H02K 5/203 |
| 9,985,500 B2* | 5/2018 | Rippel | ...................... | H02K 1/32 |
| 10,027,195 B2* | 7/2018 | Jeong | ....................... | H02K 9/19 |
| 10,211,688 B2* | 2/2019 | Watanabe | ........... | H02K 21/046 |
| 2009/0261667 A1 | 10/2009 | Matsubara et al. | | |
| 2011/0169353 A1 | 7/2011 | Endo | | |
| 2012/0013206 A1* | 1/2012 | Meyer | ..................... | H02K 1/32 29/596 |
| 2017/0346371 A1* | 11/2017 | Gruetzner | ............. | H02K 9/197 |

(Continued)

FOREIGN PATENT DOCUMENTS

| | | | |
|---|---|---|---|
| DE | 10 2008 001 607 A1 | 11/2009 | |
| JP | 2010-239799 A | 10/2010 | |
| JP | 2012-210120 A | 10/2012 | |

(Continued)

*Primary Examiner* — Alex W Mok
(74) *Attorney, Agent, or Firm* — SEED INTELLECTUAL PROPERTY LAW GROUP LLP

(57) ABSTRACT

An electric machine has a stator and a rotor arranged on a hollow shaft and able to turn relative to the stator about an axis of rotation, wherein the hollow shaft comprises, in a shaft casing, at least one shaft exit opening for coolant supplied to a shaft interior space of the hollow shaft. A cover element is arranged next to the rotor on the hollow shaft, in which is formed a fluid duct comprising a fluid duct inlet and a fluid duct outlet, wherein the fluid duct inlet overlaps with the shaft exit opening and the fluid duct outlet overlaps with a coolant duct inlet of a coolant duct reaching through the rotor in the axial direction relative to the axis of rotation, having a coolant duct outlet on its side opposite the coolant duct inlet, through which the coolant emerges from the rotor.

6 Claims, 3 Drawing Sheets

(56) References Cited

U.S. PATENT DOCUMENTS

2018/0013326 A1\* 1/2018 Mongeau ................. H02K 1/16
2018/0375395 A1 12/2018 Yamagishi

FOREIGN PATENT DOCUMENTS

JP 2019-187063 A 10/2019
WO 2015/132021 A1 9/2015

\* cited by examiner

ELECTRIC MACHINE

BACKGROUND

Technical Field

Embodiments of the invention relate to an electric machine, having a stator and a rotor arranged on a hollow shaft and able to turn relative to the stator about an axis of rotation, wherein the hollow shaft comprises, in a shaft casing, at least one shaft exit opening for coolant supplied to a shaft interior space of the hollow shaft.

Description of the Related Art

There is known from the prior art the publication WO 2015/132021 A1, for example. This describes an electric machine, having a rotor, a stator and a speed sensor. The rotor here comprises a hollow shaft. A tube is arranged co-rotating on the rotor, protruding into an interior space of the hollow shaft, so that a cooling fluid can flow through the tube into the interior space. A speed sensor is mounted on a portion of the tube extending above the hollow shaft. Heat arising in the rotor of the electric machine, which can be designed as an induction machine for example, can be efficiently removed by a cooling of the hollow shaft. At the same time, because the speed sensor is mounted not on the hollow shaft, but on the tube, it is possible to measure the speed or position of the rotor by using a small-sized speed sensor.

Furthermore, the publication DE 10 2008 001 607 A1 discloses an electric machine for a vehicle, having a rotor with a rotor shaft and possessing a cooling mechanism comprising a coolant. It is proposed that the rotor shaft be designed as a hollow shaft having an inner wall with coolant flowing through it, and having in its interior at least one coolant supply element joined to the inner wall of the hollow shaft and delivering coolant by its rotation along with the hollow shaft.

BRIEF SUMMARY

Described herein are electric machines having benefits as compared to known electric machines, especially making possible a more effective cooling of the rotor.

A cover element is arranged next to the rotor on the hollow shaft, in which is formed a fluid duct comprising a fluid duct inlet and a fluid duct outlet, wherein the fluid duct inlet overlaps with the shaft exit opening and the fluid duct outlet overlaps with a coolant duct inlet of a coolant duct reaching through the rotor in the axial direction relative to the axis of rotation, having a coolant duct outlet on its side opposite the coolant duct inlet, through which the coolant emerges from the rotor.

The electric machine is in the form of an electric motor or a generator, for example. In the first case, the electric machine serves in particular for propelling a motor vehicle, i.e., providing a driving torque intended to drive the motor vehicle. In this case, the electric machine can also be called a traction machine and may be a component of the motor vehicle.

The electric machine comprises the stator, the rotor and the hollow shaft. The stator is arranged stationary in relation to a machine housing of the electric machine, in particular, it is fastened to the machine housing. The rotor, on the other hand, is mounted to turn together with the hollow shaft relative to the stator, namely, about the axis of rotation. For this, the rotor is rotationally fixed to the hollow shaft, for example, in that the hollow shaft has a toothing on its outer side, which stands in form fitting engagement with a mating toothing of the rotor, so that the rotor is firmly connected to the hollow shaft in the circumferential direction.

The electric machine may be configured as a permanently excited synchronous machine. For this, the rotor has at least one permanent magnet, while the stator has at least one electrical winding. Multiple permanent magnets may be arranged in the rotor and the stator has multiple windings. The reverse configuration is also possible. Of course, other embodiments of the electric machine can also be realized.

In any case, heat is formed during the operation of the electric machine, and this needs to be removed from the rotor. This is done by means of a coolant, which is supplied to a shaft interior space of the hollow shaft. For example, a coolant lance protrudes into the hollow shaft or the shaft interior space of the hollow shaft, through which the coolant is brought at least for a time into the shaft interior space. In this way, an especially effective cooling of the rotor is possible.

For example, it is proposed that the rotor is connected to the hollow shaft in thermally conductive manner, so that the heat arising in the rotor is dissipated through the hollow shaft to the coolant located therein. The coolant then exits through the at least one shaft exit opening from the shaft interior space or the hollow shaft and arrives in a machine housing interior of the machine housing of the electric machine. From here, the coolant is removed from the electric machine. However, this is relatively inefficient, because the heat is taken at first by the tube inwardly in the radial direction of the hollow shaft and then to the hollow shaft, and after this it must be transferred to the coolant.

For this reason, the cover element is part of the electric machine, being arranged next to the rotor on the hollow shaft. Accordingly, the cover element is present next to the rotor in the axial direction. Furthermore, it lies against the rotor and in particular it is fastened to the rotor. The cover element has dimensions in the axial direction which are significantly smaller than the dimensions of the rotor in the same direction. For example, the dimensions of the cover element in the axial direction are at most 10%, at most 7.5%, at most 5% or at most 2.5% of the dimensions of the rotor in the same direction. In the radial direction, the cover element embraces the rotor at least partly, such as by at least 50% or more. The cover element may embrace the rotor entirely in the radial direction, so that an exterior shell surface of the cover element in the radial direction is flush with an exterior shell surface of the rotor in the radial direction.

The fluid duct is formed in the cover element, having on the one hand the fluid duct inlet and on the other hand the fluid duct outlet. The fluid duct inlet is accordingly connected fluidically by the fluid duct to the fluid duct outlet. The fluid duct is configured in the cover element and the cover element is arranged relative to the hollow shaft such that the fluid duct inlet overlaps with the shaft exit opening. Thus, the cover element overlaps the shaft exit opening of the hollow shaft such that a fluidic connection is produced between the shaft interior space of the hollow shaft and the fluid duct of the cover element. The cover element may lie in sealing manner against the hollow shaft, so that the coolant can only emerge from the shaft interior space into the fluid duct and not between the rotor and the hollow shaft.

The fluid duct is furthermore arranged in the cover element and the cover element is arranged relative to the rotor such that the fluid duct outlet of the fluid duct overlaps with the coolant duct inlet of the coolant duct of the rotor. The coolant duct is formed in the rotor and reaches through it in the axial direction at least partly, such as entirely. The coolant duct may have a continuous straight course and may moreover be arranged parallel to the axis of rotation.

The coolant duct comprises on the one hand the coolant duct inlet and on the other hand the coolant duct outlet. Thus, here as well, the coolant duct inlet is fluidically connected by the coolant duct to the coolant duct outlet. The cover element lies tightly against the rotor, so that a tight fluidic connection is formed between the fluid duct of the cover element and the coolant duct of the rotor. For example, a seal is present for this purpose between the cover element and the rotor. It may also be provided that the cover element is integrally joined to the rotor, so that the tight connection is present.

For the cooling of the electric machine it is thus proposed that coolant is supplied to the shaft interior space of the hollow shaft, for example, via the coolant lance. The coolant supplied to the shaft interior space emerges through the shaft exit opening of the hollow shaft and enters into the fluid duct of the cover element. During the operation of the electric machine, for example, the coolant is forced out by the rotary movement of the hollow shaft from the shaft exit opening, namely, thanks to the centrifugal force acting on the coolant.

The coolant flows through the fluid duct of the cover element and then arrives in the coolant duct of the rotor. It flows through the coolant duct and then exits through the coolant duct outlet from the coolant duct and accordingly from the rotor. The coolant takes up heat as it flows through the coolant duct, so that the rotor is cooled. An especially effective and efficient removal of heat occurs thanks to the direct contact between the rotor and the coolant duct.

Thanks to the cover element, moreover, a supply of the coolant present in the hollow shaft to the rotor is created with extremely little design expense. Thus, it is not necessary to have radial openings or the like in the rotor itself, through which the coolant can go directly from the hollow shaft into the rotor. Instead, thanks to the cover element, it is possible to keep the design expense very low and to have a flexible design for the coolant flow through the electric machine.

One modification proposes that an additional cover element is arranged on the hollow shaft at the side of the rotor opposite the cover element, in which an additional fluid duct is formed with an additional fluid duct inlet and an additional fluid duct outlet, the additional fluid duct inlet overlapping with the coolant duct outlet. In addition to the cover element, there is present the additional cover element. The cover element and the additional cover element take up the rotor between them, viewed in the axial direction, i.e., they are arranged on opposite sides thereof. The remarks about the cover element may also be applied to the additional cover element, especially as regards its arrangement.

The additional cover element, like the cover element, is rotationally fixed to the hollow shaft. Thus, the cover element and the additional cover element are rotationally fixed relative to the rotor. They each lie against the rotor, such as in a tight manner. The additional fluid duct is present in the additional cover element, fluidically connecting the additional fluid duct inlet to the additional fluid duct outlet. Accordingly, the additional fluid duct inlet and the additional fluid duct outlet are present at opposite ends of the additional fluid duct.

The additional cover element is arranged relative to the rotor such that the additional fluid duct inlet overlaps with the coolant duct outlet of the coolant duct formed in the rotor. Accordingly, the additional fluid duct is fluidically connected to the coolant duct and through this to the fluid duct of the cover element. The additional cover element ensures a draining or changing of direction of the coolant by a simple design.

One modification proposes that the additional fluid duct outlet is formed on the side of the additional cover element facing away from the rotor, viewed in the axial direction, so that the additional fluid duct empties through the additional fluid duct outlet into a machine housing interior of the electric machine. In such a configuration or arrangement of the additional fluid duct outlet, this serves for draining the coolant from the rotor.

Since the additional fluid duct inlet and the additional fluid duct outlet are arranged at opposite ends of the additional cover element, viewed in the axial direction, the coolant used for the cooling of the electric machine is drained at a distance from the rotor into the machine housing interior of the electric machine. By the machine housing interior is meant here the interior of the machine housing of the electric machine, in which the stator and the rotor are arranged, namely, entirely arranged in particular. The draining of the coolant at a distance from the rotor reliably avoids an influencing of the rotor by the coolant.

One modification proposes that the additional fluid duct has a direction change in the additional cover element, so that the additional fluid duct outlet is formed on a side of the additional cover element adjacent to the rotor, viewed in the axial direction. In this configuration, the coolant after emerging from the rotor and entering into the additional cover element is deflected in the direction of the rotor, especially so as to again supply the coolant to it. In this way, the cooling of the rotor can be further improved.

One modification proposes that the additional fluid duct outlet overlaps with an additional coolant duct inlet of an additional coolant duct reaching through the rotor in the axial direction relative to the axis of rotation. Thus, in addition to the coolant duct, there is formed in the rotor the additional coolant duct. The additional coolant duct comprises the additional coolant duct inlet and an additional coolant duct outlet, which are present on opposite sides of the additional coolant duct. In other words, the additional coolant duct outlet is thus fluidically connected via the coolant duct to the additional coolant duct inlet.

The additional coolant duct reaches at least partly, and in some instances entirely, through the rotor in the axial direction. Similar to the coolant duct, the additional coolant duct may run entirely straight and may be arranged in parallel with the longitudinal central axis. For example, the additional coolant duct is overlapping with the coolant duct, viewed in the circumferential direction, that is, it is in the same location viewed in the circumferential direction. In this case, the coolant duct and the additional coolant duct may be at a distance from each other in the radial direction. Alternatively, it may be provided that the coolant duct and the additional coolant duct overlap each other, viewed in the radial direction. For example, they are at a distance from each other in the circumferential direction.

Coolant flows through the additional coolant duct after the coolant duct and after the changing of direction of the coolant by the additional cover element. In other words, the coolant flows through the rotor multiple times, namely, at least once through the coolant duct and once through the additional coolant duct. In this way, an especially effective cooling of the rotor is achieved.

One modification proposes that an outlet duct is formed in the cover element having an outlet duct inlet and an outlet duct outlet, the outlet duct inlet overlapping with an additional coolant duct outlet of the additional coolant duct and the outlet duct outlet being present on the side of the cover element facing away from the rotor. The outlet duct is configured in the cover element and comprises the outlet duct inlet and the outlet duct outlet. Accordingly, the outlet duct outlet is fluidically connected via the outlet duct to the outlet duct inlet.

The cover element is arranged relative to the rotor such that the outlet duct inlet overlaps with the additional coolant duct outlet of the additional coolant duct. Consequently, the outlet duct stands in fluidic connection with to additional coolant duct and, through this, to the additional fluid duct. The outlet duct inlet and the outlet duct outlet are formed at opposite ends of the cover element, viewed in the axial direction. Accordingly, the coolant after flowing through the outlet duct emerges from the cover element at the end facing away from the rotor, namely, into the machine housing interior. In this way, once again, an influencing of the rotor by the coolant is avoided.

One modification proposes that the coolant duct is part of a plurality of coolant ducts and the additional coolant duct is part of a plurality of additional coolant ducts, respectively formed in the rotor. Each of the coolant ducts is fluidically connected by the fluid duct or by one of multiple fluid ducts to the shaft interior space of the hollow shaft. For example, multiple shaft exit openings are formed in the shaft casing, so that the aforementioned shaft exit opening is one of multiple shaft exit openings.

It may be provided that one of the shaft exit openings, especially precisely one of the shaft exit openings, stands in fluidic connection with one of the coolant ducts, especially precisely one of the coolant ducts, each time through one of the multiple fluid ducts. However, it may also be provided that one stands in fluidic connection each time through one of the multiple fluid ducts. However, it may also be provided that the fluid duct has an annular space or is formed as an annular space and stands in fluidic connection on the one hand with precisely one or more shaft exit openings and on the other hand with precisely one or more coolant ducts.

Similarly, it may be provided for the additional fluid duct that it is fluidically connected on the one hand to precisely one or more coolant ducts and on the other hand to precisely one or more additional coolant ducts. For example, the additional fluid duct is present as an annular space or at least comprises one such space for this purpose. The additional fluid duct may be one of multiple fluid ducts. These may be configured such that each time precisely one of the fluid ducts is fluidically connected to precisely one of the additional fluid ducts.

More coolant ducts than additional coolant ducts may be formed in the rotor. For example, twice as many coolant ducts as additional coolant ducts are realized. Accordingly, one such additional coolant duct is associated with only every other of the coolant ducts. The additional coolant ducts consequently have twice as large a distance from each other in the circumferential direction as do the coolant ducts, since both the coolant ducts and the additional coolant ducts are arranged equally distributed in the circumferential direction in the rotor.

Now, a fluid duct is present in the cover element for each of the coolant ducts, fluidically connecting the coolant duct to the shaft interior space of the hollow shaft. For the additional cover element, it may be provided that a portion of the additional fluid duct outlets empty into the machine housing interior on the side of the additional cover element facing away from the rotor some of them have the additional fluid duct outlet at the sides of the rotor. For example, this is done alternating in the circumferential direction, so that both configurations may be present with equal frequency. Thus, the coolant flowing through the coolant duct in the direction of the additional cover element is partly drained through the additional fluid duct outlets into the machine housing interior and partly returned through the additional fluid duct outlets to the additional coolant ducts.

Each of the additional coolant ducts is associated, at the sides of the cover element, with one of multiple outlet ducts, through which the coolant is drained at the sides of the cover element into the machine housing interior. The additional fluid duct outlets facing away from the rotor and the outlet duct outlets may overlap, viewed in the radial direction, so that the draining of the coolant into the machine housing interior occurs at the same radial position.

One modification proposes that the additional fluid duct outlet and/or the outlet duct outlet have a flow cross section area which is different from a flow cross section area of the coolant duct and/or a flow cross section area of the additional coolant duct. In this way, the flow resistance for the coolant through the electric machine can be easily adjusted to different values for the same rotor, by replacing the cover element and/or the additional cover element. For example, different electric machines can thus be realized having the same stator but different cover elements and/or different additional cover elements, and having different cooling despite the rotors being the same.

One modification proposes that the cover element and/or the additional cover element consist of a material different from the material of the rotor. For example, metal, especially iron, is used as the material of the rotor. The cover element and/or the additional cover element, on the other hand, may consist of plastic. In addition or alternatively, they consist of a solid material, i.e., they are formed as a massive single piece. The rotor, on the other hand, may be assembled from individual parts made of the material, for example, it consists of a plurality of plates arranged next to each other, which can be called accordingly rotor plates. Thus, the rotor is present for example as a laminated core made of such rotor plates. The described configuration enables an economical and flexible production of the electric machine.

One modification proposes that the rotor consists of a plurality of adjacently situated rotor plates, in which the coolant duct and/or the additional coolant duct are formed by stamping. The rotor plates may consist of metal, such as iron. The rotor plates are individually subjected to a stamping process, during which the coolant duct and/or the additional coolant duct are formed for a portion in the corresponding rotor plate. After this, the rotor plates are arranged on one another such that the coolant duct and/or the additional coolant duct result from the individual portions of the coolant duct or the additional coolant duct which are formed in them. This procedure is economical and easy to implement.

An electric machine may be summarized as comprising: a stator, and a rotor arranged on a hollow shaft and able to turn relative to the stator about an axis of rotation, wherein the hollow shaft comprises, in a shaft casing, a plurality of first shaft exit openings for coolant supplied to a shaft interior space of the hollow shaft, and a plurality of second shaft exit openings for the coolant supplied to the shaft interior space of the hollow shaft, wherein the first shaft exit openings alternate with the second shaft exit openings around a circumference of the hollow shaft, wherein a first cover element is arranged next to a first end of the rotor on the hollow shaft, wherein a first plurality of first fluid ducts, each comprising a respective fluid duct inlet and a respective fluid duct outlet, is formed in the first cover element, wherein a second plurality of first fluid ducts, each comprising a respective fluid duct inlet and a respective fluid duct outlet, is formed in the first cover element, wherein the fluid duct inlets of the first plurality of first fluid ducts overlap with the first shaft exit openings and the fluid duct outlets of the first plurality of first fluid ducts overlap with respective coolant duct inlets of respective first coolant ducts extending through the rotor in an axial direction relative to the axis of rotation, wherein the fluid duct inlets of the second plurality of first fluid ducts overlap with the second shaft exit openings and the fluid duct outlets of the second plurality of first fluid ducts overlap with respective coolant duct inlets of respective second coolant ducts extending through the rotor in the axial direction relative to the axis of rotation, wherein the first coolant ducts have respective coolant duct outlets opposite the coolant duct inlets, wherein the second coolant ducts have respective coolant duct outlets opposite the coolant duct inlets, wherein a second cover element is arranged next to a second end of the rotor, opposite to the first end of the rotor, on the hollow shaft, wherein a first plurality of second fluid ducts, each comprising a respective fluid duct inlet and a respective fluid duct outlet, is formed in the second cover element, wherein each of the fluid duct inlets of the first plurality of second fluid ducts overlaps with a coolant duct outlet of a respective first coolant duct, and wherein each of the fluid duct outlets of the first plurality of second fluid ducts empties into a machine housing interior of the electric machine, and wherein a second plurality of second fluid ducts, each comprising a respective fluid duct inlet and a respective fluid duct outlet, is formed in the second cover element, wherein each of the fluid duct inlets of the second plurality of second fluid ducts overlaps with a coolant duct outlet of a respective second coolant duct, and wherein each of the fluid duct outlets of the second plurality of second fluid ducts overlaps with a coolant duct inlet of a respective additional coolant duct extending through the rotor in the axial direction relative to the axis of rotation.

DETAILED DESCRIPTION

Figure 1:
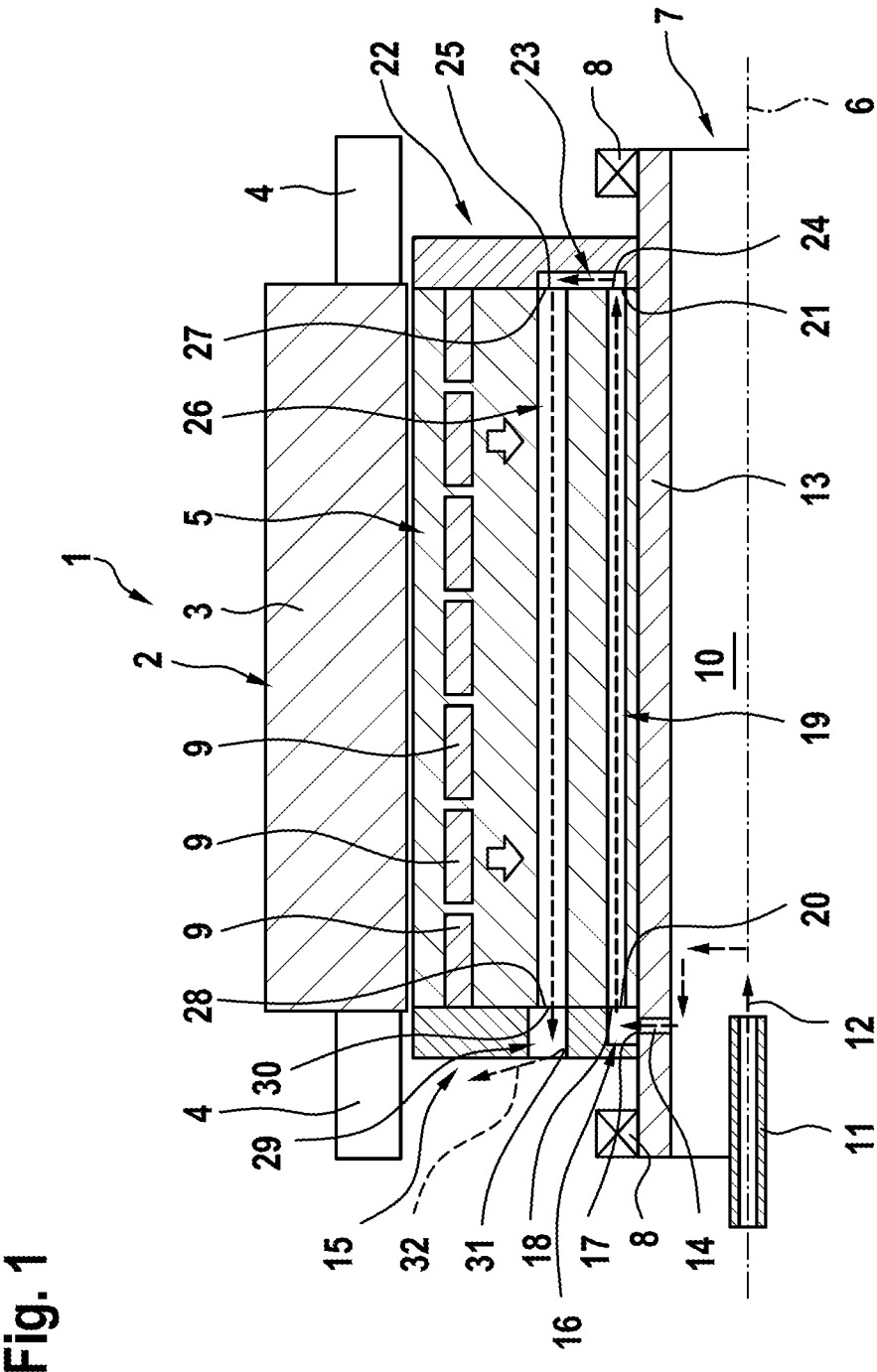
FIG. 1 illustrates a schematic representation of an electric machine having a stator and a rotor in a first embodiment.

FIG. 1 shows a schematic representation of an electric machine 1 having a stator 2, comprising a laminated core 3, beyond which winding heads 4 of windings of the stator 2 protrude at both ends. A rotor 5 of the electric machine 1 is mounted rotatably about an axis of rotation 6 relative to the stator 2, namely, by means of a hollow shaft 7. The hollow shaft 7 in the embodiment shown is rotatably mounted by a bearing 8 on either side of the rotor 5 in the axial direction, relative to the axis of rotation 6, namely, it is mounted in a machine housing of the electric machine 1, not shown here. A plurality of magnets 9 are arranged in the rotor 5, only a few of which are indicated here as an example. In the embodiment shown here, the electric machine 1 is a permanently excited synchronous machine, so that the magnets 9 are permanent magnets.

For the cooling of the electric machine 1 or the rotor 5, a coolant is supplied at least part of the time to a shaft interior space 10 of the hollow shaft 7. This is done, for example, with the aid of a coolant lance 11. The introducing of the coolant is indicated for example by the arrow 12. During a rotary movement of the rotor 5 or the hollow shaft 7, the coolant introduced into the shaft interior space 10 is forced by the centrifugal force acting on the coolant against a shaft casing 13, which bounds the shaft interior space 10 on the outside in the radial direction. A shaft exit opening 14 is formed in the shaft casing 13, through which the coolant subjected to centrifugal force can emerge from the shaft interior space 10.

Arranged next to the rotor 5 on the hollow shaft 7 is a cover element 15, in which a fluid duct 16 is formed, having a fluid duct inlet 17 and a fluid duct outlet 18. The fluid duct inlet 17 overlaps with the shaft exit opening 14, so that the fluid duct 16 is fluidically connected to the shaft interior space 10. By the fluid duct outlet, a coolant duct 19 is fluidically connected to the fluid duct 16.

The coolant duct 19 has a coolant duct inlet 20 and a coolant duct outlet 21 and it extends in the axial direction through the rotor 5. It has a continuously straight course and lies parallel with the axis of rotation 6. The coolant duct inlet 20 overlaps with the fluid duct outlet 18, so that the fluidic connection between the coolant duct 19 and the fluid duct 16 is produced. Accordingly, the coolant duct 19 also stands in a fluidic connection with the shaft interior space 10, namely, through the fluid duct 16.

On the side of the rotor 5 facing away from the cover element 15, an additional cover element 22 is arranged on the hollow shaft 7. In the additional cover element 22, there is present an additional fluid duct 23 with an additional fluid duct inlet 24 and an additional fluid duct outlet 25. In the first embodiment shown here, the additional fluid duct 23 is fluidically connected to an additional coolant duct 26. For this purpose, an additional coolant duct inlet 27 is arranged overlapping with the additional fluid duct outlet 25.

On its side facing away from the additional coolant duct inlet 27, the additional coolant duct 26 has an additional coolant duct outlet 28. Through this, the additional coolant duct 26 is connected fluidically to an outlet duct 29, having an outlet duct inlet 30 and an outlet duct outlet 31. The outlet duct outlet 31 is formed on the side of the cover element 15 facing away from the rotor 5. Through the outlet duct outlet 31, the coolant after flowing through the coolant duct 19, the additional fluid duct 23 and the additional coolant duct 26 can emerge into the shaft interior space 10, especially in the direction of the winding heads 4. This is indicated by arrow 32.

Figure 2:
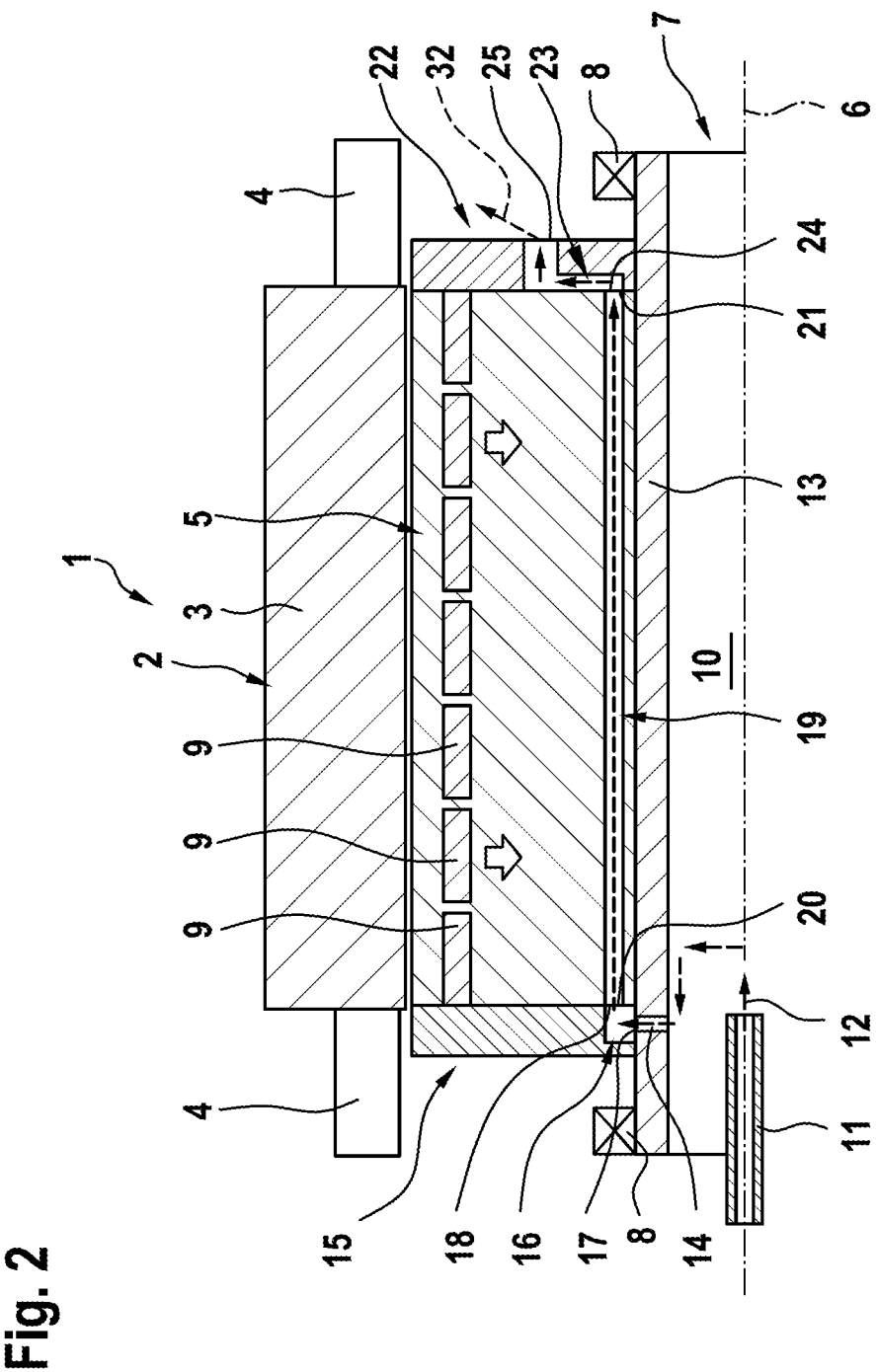
FIG. 2 illustrates a schematic representation of an electric machine in a second embodiment.
Figure 3:
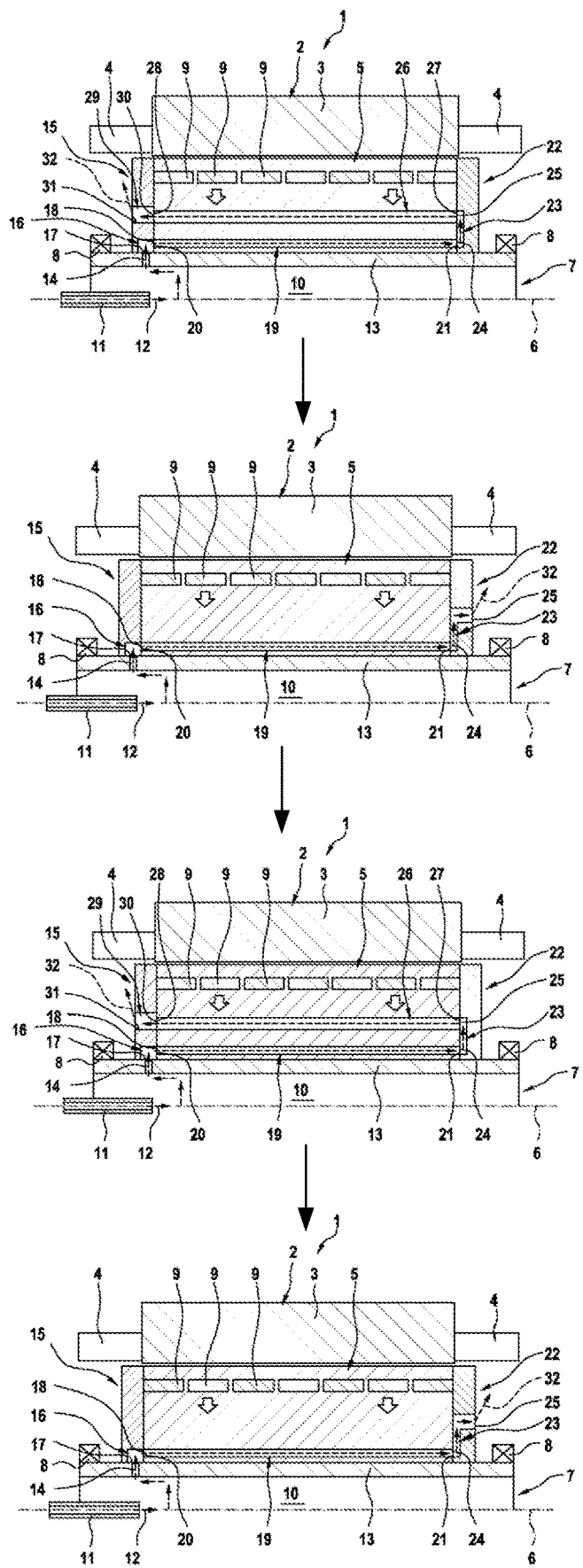
FIG. 3 illustrates a schematic representation of an electric machine wherein first shaft exit openings alternate with second shaft exit openings around a circumference of a hollow shaft.

FIG. 2 shows a schematic configuration of the electric machine 1 in a second embodiment. This is basically similar to the first embodiment, so that reference is made to the corresponding remarks and only the differences shall be discussed in the following. These lie in the fact that the outlet duct 29 is lacking and the additional fluid duct outlet 25 is present not on the side of the additional cover element 22 facing toward the rotor 5, as in the first embodiment, but instead on the side facing away from the rotor 5, so that the coolant emerges through the additional fluid duct outlet 25 into a machine housing interior.

One configuration combines the first embodiment and the second embodiment by implementing the two configurations for different coolant ducts 19. Accordingly, the first embodiment is implemented for a portion of multiple coolant ducts 19 and the second embodiment is implemented for another portion of the coolant ducts 19. The configurations according to the first embodiment and the second embodiment may be alternately implemented for coolant ducts 19 immediately following each other in the circumferential direction. In this way, an emergence of the coolant into the machine housing interior is achieved in equal measure on both sides of the rotor 5, so that a cooling of the winding heads 4 of the stator 2 by the coolant occurs in addition to the cooling of the rotor 5.

The described configuration of the electric machine 1 enables an especially effective and efficient cooling of the electric machine 1, especially the rotor 5, with a simple design.

German patent application no. 102020106341.5, filed Mar. 9, 2020, to which this application claims priority, is hereby incorporated herein by reference in its entirety.

Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, comprising:
a stator; and
a rotor arranged on a hollow shaft and able to turn relative to the stator about an axis of rotation;
wherein the hollow shaft comprises, in a shaft casing, a plurality of first shaft exit openings for coolant supplied to a shaft interior space of the hollow shaft, and a plurality of second shaft exit openings for the coolant supplied to the shaft interior space of the hollow shaft, wherein the first shaft exit openings alternate with the second shaft exit openings around a circumference of the hollow shaft;
wherein a first cover element is arranged next to a first end of the rotor on the hollow shaft;
wherein a first plurality of first fluid ducts, each comprising a respective fluid duct inlet and a respective fluid duct outlet, is formed in the first cover element;
wherein a second plurality of first fluid ducts, each comprising a respective fluid duct inlet and a respective fluid duct outlet, is formed in the first cover element;
wherein the fluid duct inlets of the first plurality of first fluid ducts overlap with the first shaft exit openings and the fluid duct outlets of the first plurality of first fluid ducts overlap with respective coolant duct inlets of respective first coolant ducts extending through the rotor in an axial direction relative to the axis of rotation;
wherein the fluid duct inlets of the second plurality of first fluid ducts overlap with the second shaft exit openings and the fluid duct outlets of the second plurality of first fluid ducts overlap with respective coolant duct inlets of respective second coolant ducts extending through the rotor in the axial direction relative to the axis of rotation;
wherein the first coolant ducts have respective coolant duct outlets opposite the coolant duct inlets;
wherein the second coolant ducts have respective coolant duct outlets opposite the coolant duct inlets;
wherein a second cover element is arranged next to a second end of the rotor, opposite to the first end of the rotor, on the hollow shaft;
wherein a first plurality of second fluid ducts, each comprising a respective fluid duct inlet and a respective fluid duct outlet, is formed in the second cover element, wherein each of the fluid duct inlets of the first plurality of second fluid ducts overlaps with a coolant duct outlet of a respective first coolant duct, and wherein each of the fluid duct outlets of the first plurality of second fluid ducts empties into a machine housing interior of the electric machine; and
wherein a second plurality of second fluid ducts, each comprising a respective fluid duct inlet and a respective fluid duct outlet, is formed in the second cover element, wherein each of the fluid duct inlets of the second plurality of second fluid ducts overlaps with a coolant duct outlet of a respective second coolant duct, and wherein each of the fluid duct outlets of the second plurality of second fluid ducts overlaps with a coolant duct inlet of a respective additional coolant duct extending through the rotor in the axial direction relative to the axis of rotation.

2. The electric machine according to claim 1, wherein an outlet duct is formed in the first cover element having an outlet duct inlet and an outlet duct outlet, the outlet duct inlet overlapping with an additional coolant duct outlet of the additional coolant duct and the outlet duct outlet being present on a side of the cover element facing away from the rotor.

3. The electric machine according to claim 2, wherein the additional fluid duct outlet and/or the outlet duct outlet have a flow cross-sectional area which is different from a flow cross-sectional area of the first coolant ducts, a flow cross-sectional area of the second coolant ducts, and/or a flow cross-sectional area of the additional coolant ducts.

4. The electric machine according to claim 2, wherein the additional fluid duct outlet and/or the outlet duct outlet are arranged overlapping with a winding head of the stator, so that coolant emerging from the additional fluid duct outlet and/or the outlet duct outlet is hurled in the direction of the winding head.

5. The electric machine according to claim 1, wherein the first cover element and/or the second cover element consist of a material different from the material of the rotor.

6. The electric machine according to claim 1, wherein the rotor consists of a plurality of adjacently situated rotor plates, in which the first coolant ducts, the second coolant ducts, and/or the additional coolant ducts are formed by stamping.

* * * * *